United States Patent [19]

Carrell et al.

[11] Patent Number: 5,431,732
[45] Date of Patent: Jul. 11, 1995

[54] APPARATUS FOR WORKING FLAT STOCK

[75] Inventors: Terry Carrell, Indianapolis, Ind.;
Joseph Adkins, Lombard, Ill.; Vern
Stahl, Chicago, Ill.; Peter Harwardt,
Orland Park, Ill.

[73] Assignee: Stewart Warner Electronics
Corporation, Chicago, Ill.

[21] Appl. No.: 77,573

[22] Filed: Jun. 15, 1993

[51] Int. Cl.$^6$ ............................................. B05C 1/06
[52] U.S. Cl. ................................. 118/256; 118/211;
118/323; 118/500
[58] Field of Search ............... 118/500, 323, 211, 256;
33/1 K, 23.06, 23.08, 23.05

[56] References Cited

U.S. PATENT DOCUMENTS

| | | | |
|---|---|---|---|
| 1,131,451 | 3/1915 | Williams | 33/23.06 |
| 2,013,681 | 9/1935 | Budelman | 33/23.06 X |
| 2,532,421 | 12/1950 | Rathje | 33/23.08 X |
| 2,600,728 | 6/1952 | Bernard | 33/23.08 X |
| 2,679,620 | 5/1954 | Berry | 33/23.08 X |
| 2,688,292 | 9/1954 | Howard | 33/23.06 X |
| 2,829,274 | 4/1958 | Schreck | 33/23.08 X |
| 2,921,179 | 1/1960 | Anderson | 33/23.08 X |
| 2,939,368 | 6/1960 | Eisenarein | 33/23.08 X |
| 2,971,079 | 2/1961 | Sommeria | 33/23.08 X |
| 3,177,586 | 4/1965 | Arno | 33/23.08 X |
| 3,213,282 | 10/1965 | Brouwer | 250/202 |
| 3,230,629 | 1/1966 | Barber | 33/23.08 X |
| 3,265,035 | 8/1966 | Rosenstein et al. | 118/256 X |
| 3,286,142 | 11/1966 | Redman | 318/18 |
| 3,393,453 | 7/1968 | Stoneman | 33/23.08 X |
| 3,423,589 | 1/1969 | Bardwell et al. | 250/202 |
| 3,566,129 | 2/1971 | Bardwell et al. | 250/202 |
| 3,991,631 | 11/1976 | Devillers | 83/12 |
| 4,134,210 | 1/1979 | Scholl et al. | 33/23.08 X |
| 4,160,199 | 7/1979 | Bardwell | 318/577 |
| 4,424,093 | 1/1984 | Schubert | 118/211 |
| 4,818,571 | 4/1989 | Pilley et al. | 427/286 |
| 5,095,625 | 3/1992 | Zimmerman | 33/23.01 |

Primary Examiner—James C. Housel
Assistant Examiner—Harold Y. Pyon
Attorney, Agent, or Firm—Lorusso & Loud

[57] ABSTRACT

Apparatus for working flat stock in accordance with a pattern, the apparatus including a table adapted to receive the pattern, a line tracer adapted automatically to move along lines of the pattern, a carriage assembly adapted to move in accordance with instructions received from the line tracer which is mounted on the carriage assembly, a tool holder mounted on the carriage assembly, the carriage assembly being adapted to move the tool holder over the flat stock in a configuration duplicating that of the pattern.

9 Claims, 6 Drawing Sheets

APPARATUS FOR WORKING FLAT STOCK

BACKGROUND OF THE INVENTION

1. Field of the Invention

This invention relates to an apparatus for working flat stock, and is directed more particularly to apparatus adapted to "read" the configuration of a pattern on, for example, a piece of paper, and trace the identical configuration in a piece of flat stock at a station remote from the pattern, for the purpose of cutting or otherwise removing material from the flat stock, or for the purpose of adding matter to the flat stock, such as adhesive, or for the purpose of welding, or the like.

2. Description of the Prior Art

It is known to provide a coordinate drive tracer, a device which traces the edge of a line or a silhouette template, to guide flat stock working equipment to produce a duplicate of the template in wood, steel, stone, or glass. The tracer includes two lamps, mounted at the bottom of the unit, which project a well defined light spot on the pattern. The light is reflected from the pattern to a photocell in the tracer unit. The photocell signal is processed by a photocell board and a logic board to produce sine and cosine signals for X and Y axes, respectively. The unit communicates with X and Y drive motors to cause the unit to be moved along the pattern. Pattern changes in direction are sensed by the photocell which initiates command signals that provide proper changes in speeds for each drive motor. A unit of this type is shown and described in U.S. Pat. No. 4,160,199, issued Jul. 3, 1979, in the name of Francis G. Bardwell.

While the line tracer itself is known, typically such tracers are sold independently of the apparatus needed to make use of the units. Accordingly, a wide range of carriage configurations for mounting tracer units and tool holders for mounting a wide range of working tools have emerged, usually with less than wholly satisfactory performance. Because the apparatus, in use, is constantly in transition, stability of the unit is of utmost importance. Slight deviations between the movements of the tracer unit and the tool holder result in imperfect duplications of the pattern. To insure stability, many users have constructed very heavy carriage assemblies and support assemblies, adapted to insure stability. Unfortunately, use of many solid steel components, while ensuring stability, has escalated costs of building and shipping the machines, and also escalated costs of running the machines which requires relatively high-powered drive motors to move the rather massive carriage components.

Accordingly, there is a need for a complete apparatus including a line tracer units a carriage assembly, and a tool holder unit, all arranged so as to facilitate readiness for operations upon receipt, to cost substantially less to fabricate and ship and operate, and yet provide stability and accuracy in repeated operations.

SUMMARY OF THE INVENTION

It is, therefore, an object of the invention to provide an apparatus for working flat stock, the apparatus including a line tracer unit adapted to read the configuration of a pattern and signal motive means which enables the tracer unit to move along the pattern, a movable carriage assembly on which the line tracer is mounted, and a line holder on the carriage assembly and spaced from the tracer unit and adapted to duplicate the movements of the tracer unit.

With the above and other objects in view, as will hereinafter appear, there is provided in accordance with a feature of the invention an apparatus for working flat stock in accordance with a pattern spaced from the flat stock, the apparatus comprising a table having a planar surface adapted to receive the pattern, tracer means adapted automatically to move along lines defining a configuration of the pattern, a carriage assembly adapted to move in accordance with instructions received from the tracer means, the tracer means being mounted on the carriage assembly, a tool holder mounted on the carriage assembly, the carriage assembly being adapted to move the tool holder over the flat stock in a configuration duplicating the configuration of the pattern, whereby a tool fixed to the tool holder is adapted to effect a working operation on the flat stock in accordance with the configuration of the pattern.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
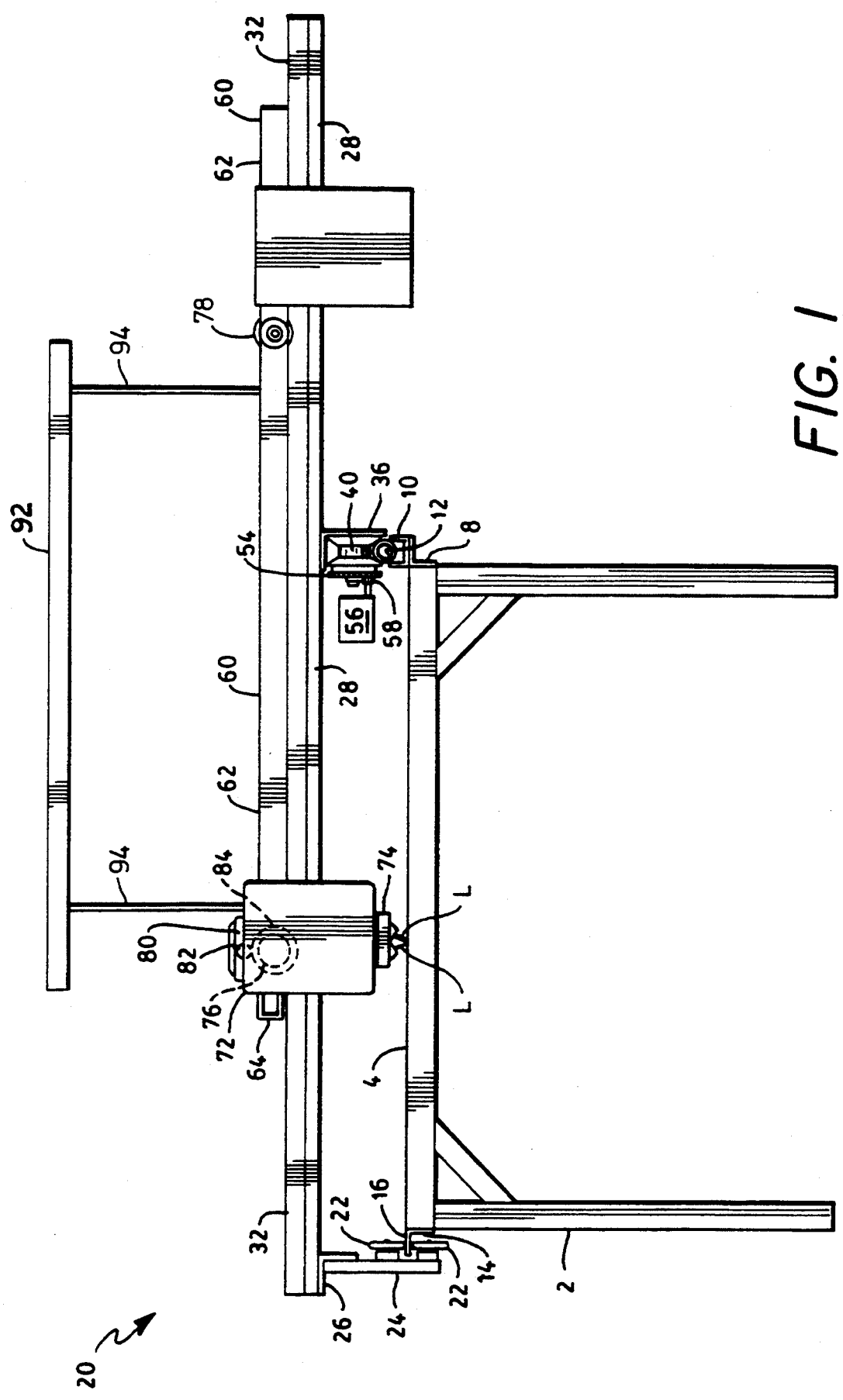
FIG. 1 is a front elevational view of one form of apparatus illustrative of an embodiment of the invention.
Figure 2:
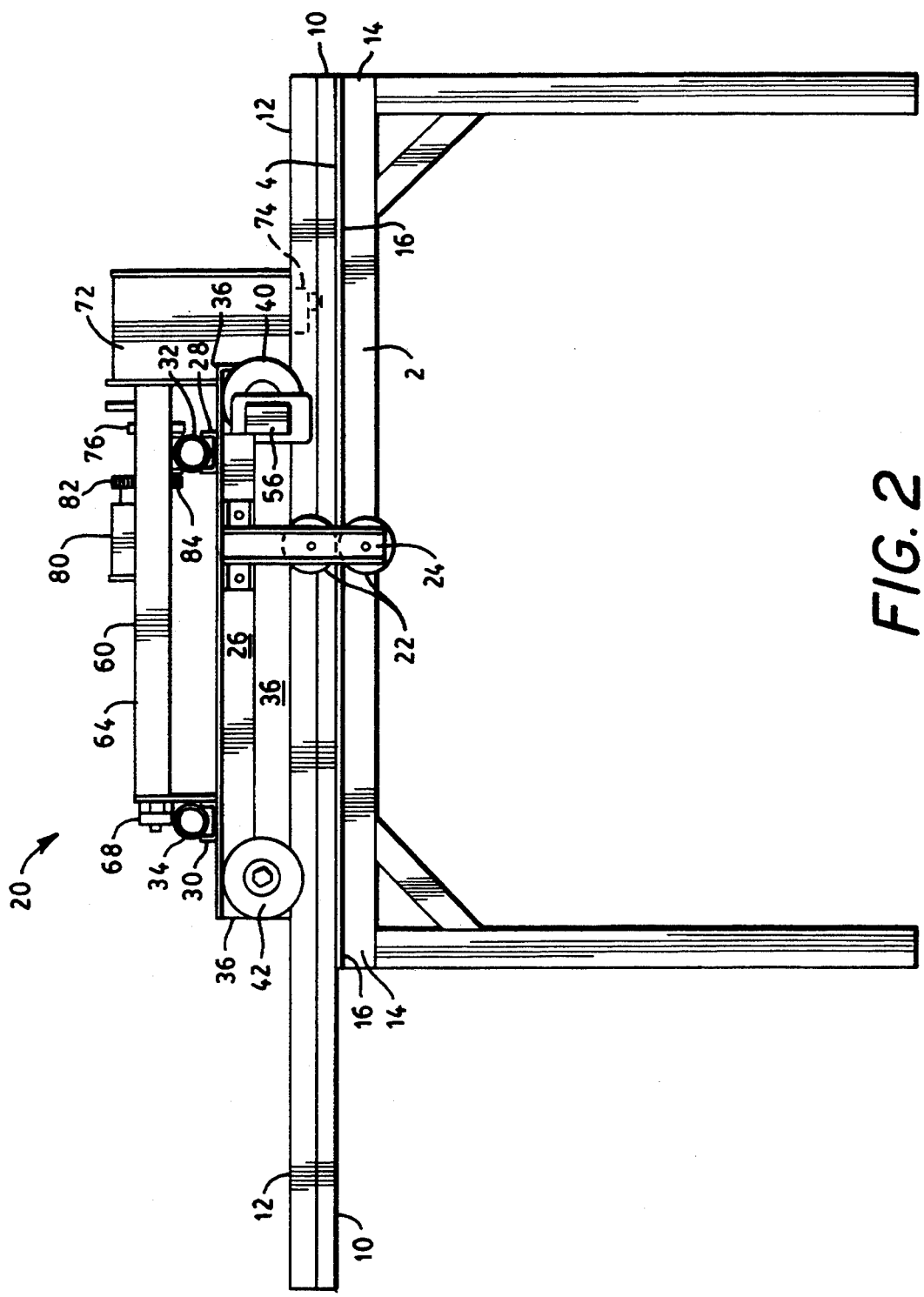
FIG. 2 is a right side elevational view thereof.
Figure 3:
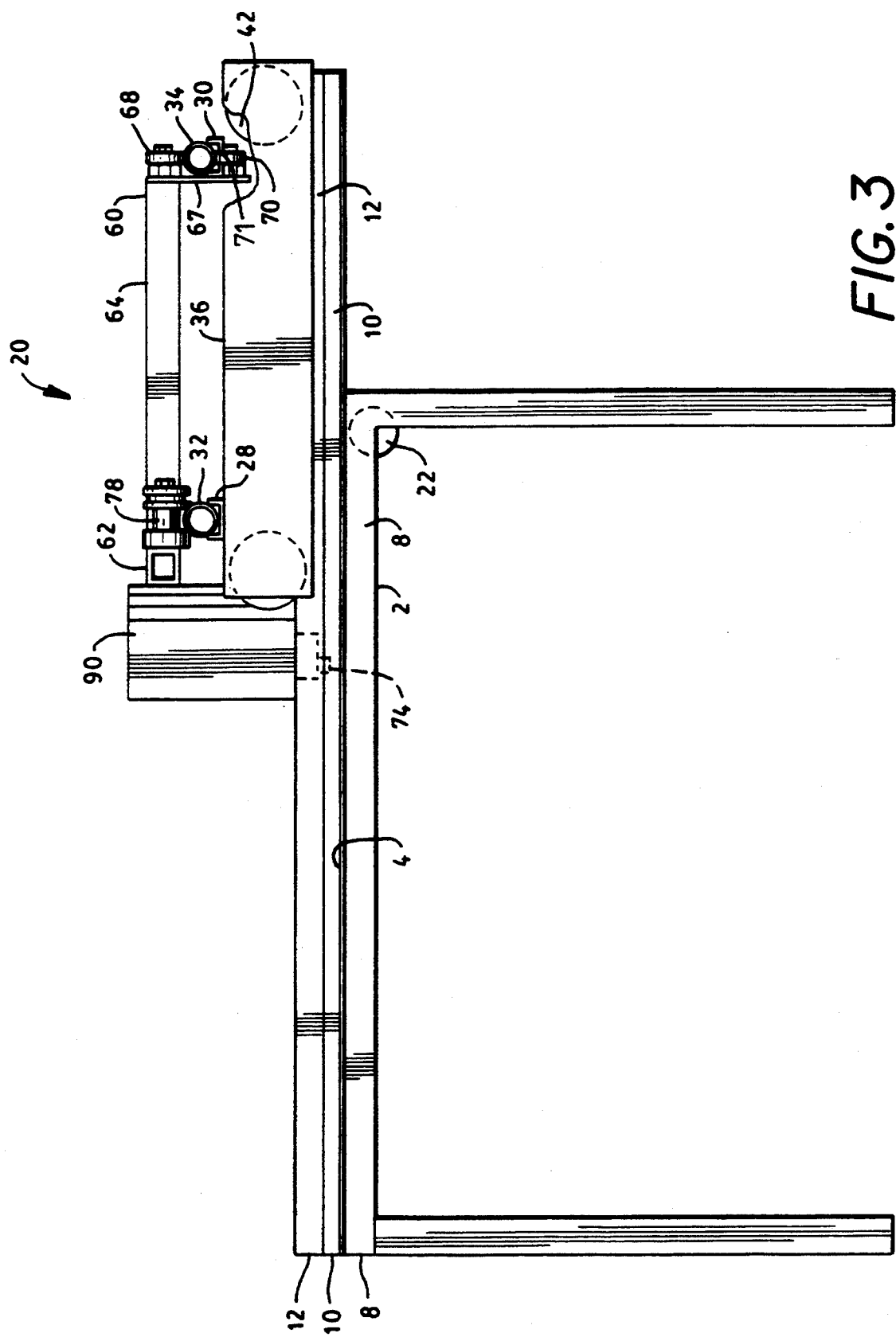
FIG. 3 is a left side elevational view thereof.
Figure 4:
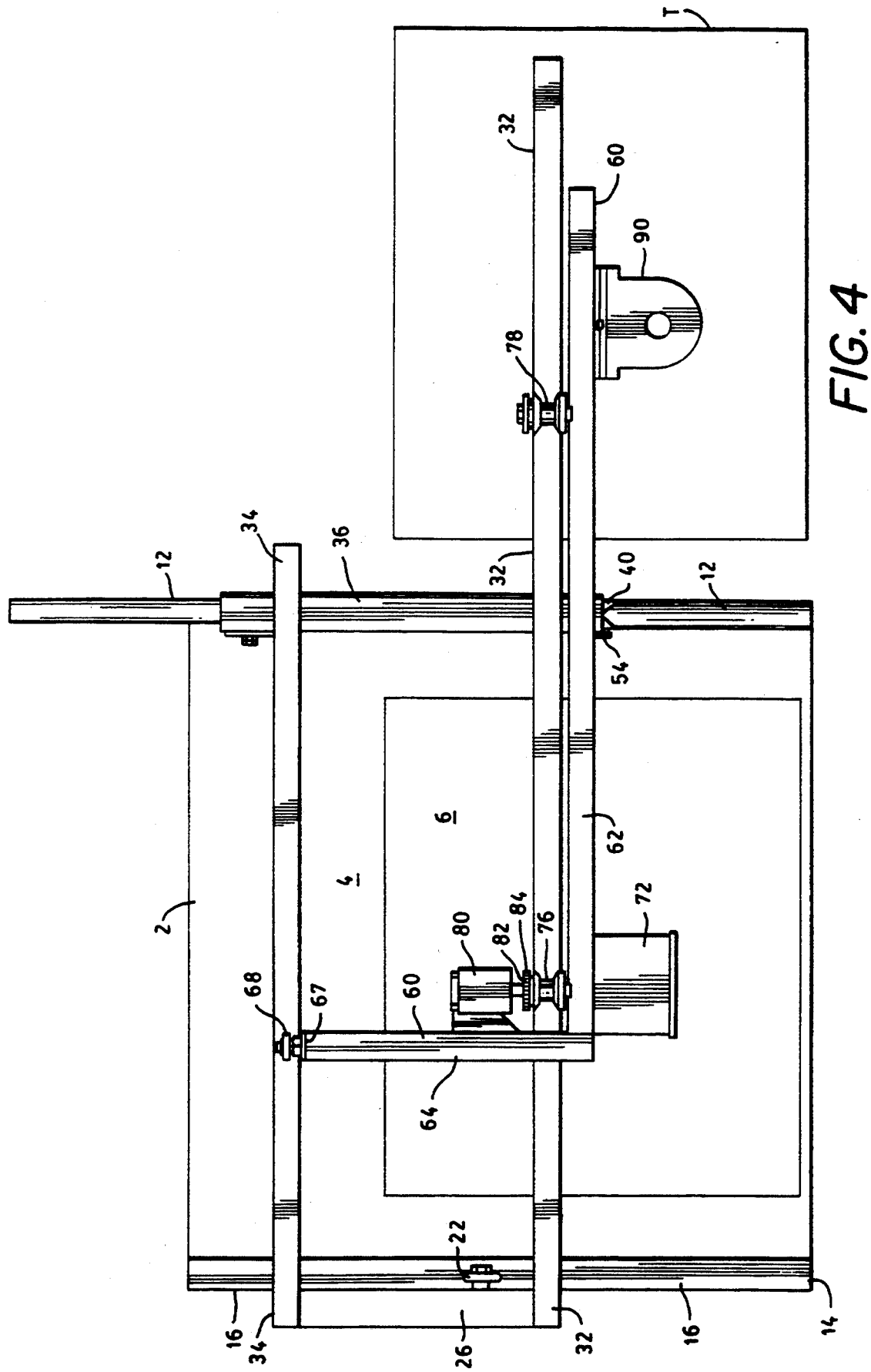
FIG. 4 is a top plan view thereof.

Referring to the drawings, particularly FIGS. 1–4, it will be seen that an illustrative embodiment of the apparatus includes a table 2 having a planar surface 4 adapted to receive a pattern (not shown) thereon, the pattern comprising a configuration defined by lines on a flat sheet 6 (FIG. 4).

Referring again to FIGS. 1–3, fixed to one side of the table 2 is a rigid L-beam 8 to which is fixed a first U-beam 10. Fixed to the U-beam and retained thereby is a rigid tube 12. Fixed to the other side of table 2 is another L-beam 14 having an outwardly extending flange 16.

Movably mounted on the table 2 is a carriage assembly 20. The carriage assembly 20 includes a pair of rollers 22 rotatably mounted on a roller support plate 24 fixed to and depending from a lower carriage L-beam 26. Attached to the front end of the L-beam 26 is a lower carriage U-beam 28 and attached to the rearward end of the L-beam 26 is a lower carriage U-beam 30. In the lower carriage U-beam 28 there is fixed a rigid front upper carriage support tube 32 and in the lower carriage U-beam 30 there is fixed a rigid rear upper carriage support tube 34.

Figure 5:
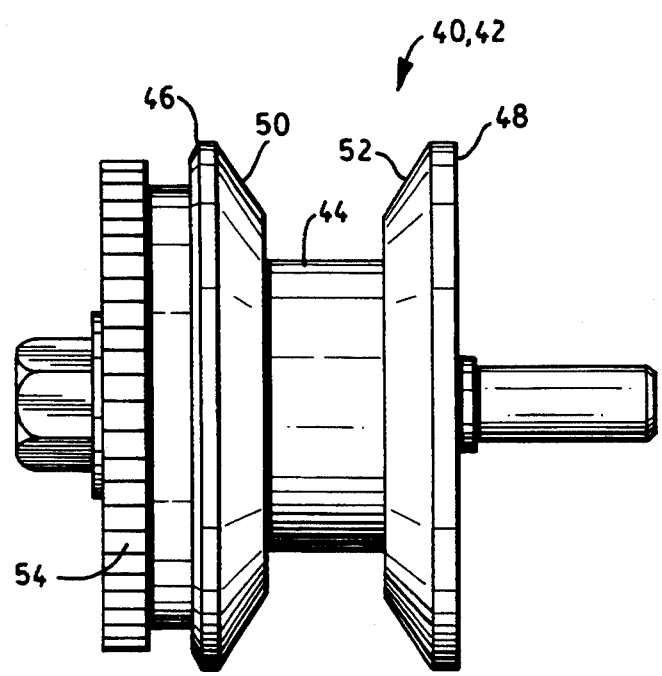
FIG. 5 is an elevational view of a component of the apparatus of FIGS. 1–4.
Figure 6:
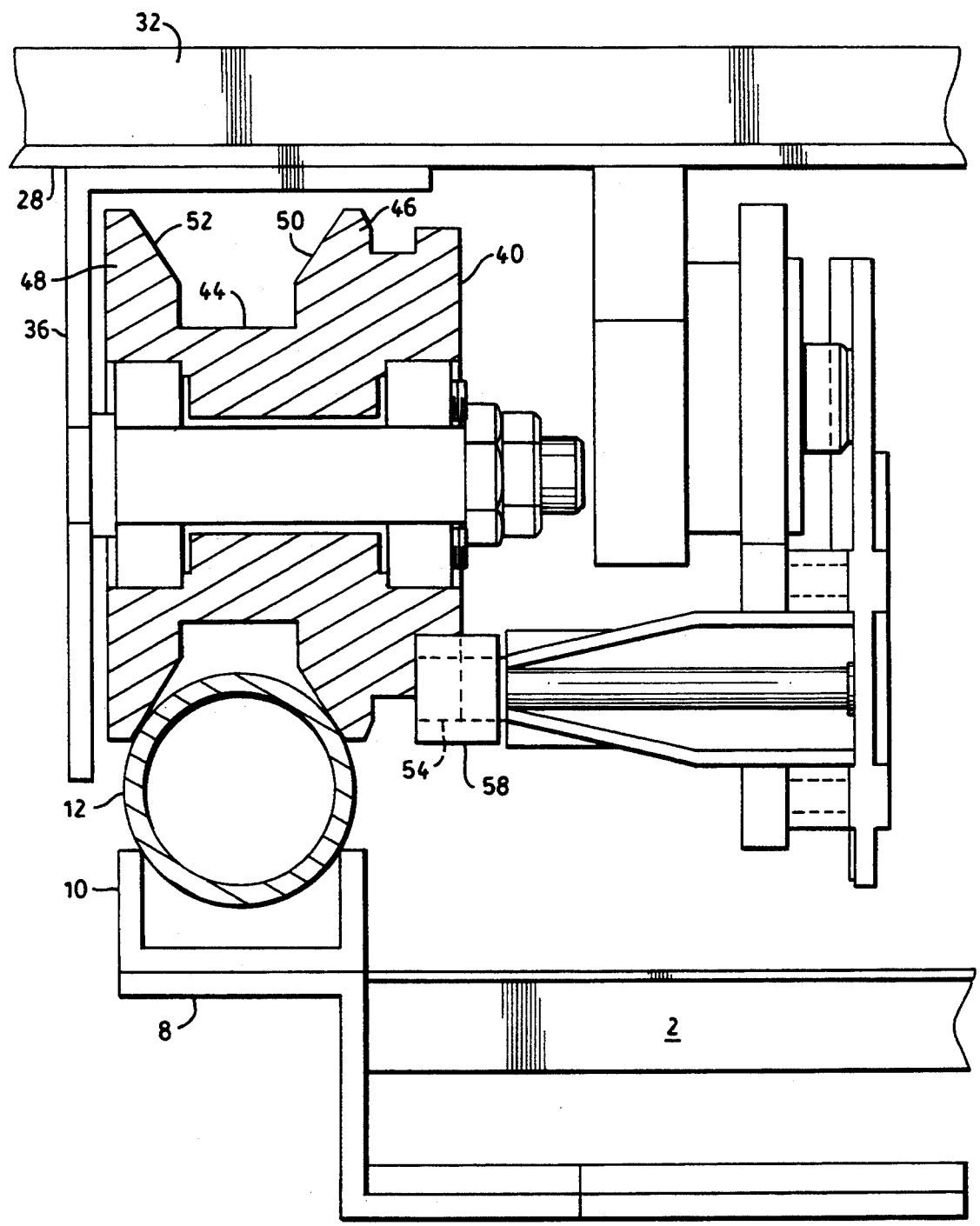
FIG. 6 is an elevational, partly sectional, view of a portion of the apparatus.

To the undersides of the lower carriage U-beams 28, 30 there is fixed a pulley carriage 36 on which are rotatably mounted pulleys 40, 42. Referring to FIG. 5, it will be seen that each of the pulleys 40, 42 is provided with a cylindrical central portion 44 and opposed flange portions 46, 48 having tapered surfaces 50, 52, respectively, which adapt the pulley to move along the tube 12. The flange portion 46 is provided with a gear portion 54. When acted upon by a motive force, such as a motor 56 operative to turn a drive gear 58, the pulley 40 moves the "lower carriage", that is the pulley carriage 36, the L-beam 26, and the carriage support tubes 32, 34, forwardly and rearwardly on the tube 12 and the flange 16. The pulleys 40, 42 ride along the tube 12 and the rollers 22 ride along the flange 16 of the L-beam 14.

Mounted on the front and rear support tubes 32, 34 is an L-shaped upper carriage 60 including a front bar 62 and a side bar 64. On a rearward free end of the side bar 64 there is fixed a roller mounting plate 67 on which is disposed an upper roller 68, adapted to roll along an upper surface of the rear upper carriage support tube 34, and a lower roller 70 (FIG. 3) adapted to engage an under surface of the tube 34. The lower roller 70 moves through a slot 71 in the center of the U-beam 30.

Fixed to the front bar 62 is an electronic line tracer 72 having an optics portion 74, the tracer being adapted to follow automatically a line on a flat surface. A pair of pulley wheels 76, 78 are rotatably mounted on the front bar 62 and are adapted to roll along the front upper carriage support tube 32. The pulley wheels 76, 78 are similar in configuration to the pulleys 40, 42. A motor 80 is fixed to the upper carriage 60 and is adapted to move a drive gear 82 threadedly engaged with a gear portion 84 of the pulley wheel 76. Thus, activation of the motor 80 operates to rotate the drive gear 82 which, in turn, rotates the pulley wheel 76 which causes the pulley wheel 76, the pulley wheel 78, and thereby the upper carriage 60 to move side-wise on the lower carriage.

Attached to the front bar 62 is a tool holder 90 which is adapted to hold and operate a selected tool, such as a router for wood working, a flame cutter for metal working, a diamond bit for stone cutting, a welding tool, an adhesive dispensing tool, a sand blasting tool, a decorating tool, and the like.

Typically, a work table T (FIG. 4) is placed alongside the table 2 and of a size permitting duplication thereon by the tool holder of a pattern of the same size and configuration as a pattern placed upon the table 2.

In operation, the flat sheet 6, having a pattern to be duplicated, is placed upon the surface 4 of the table 2. The line tracer 72 is energized and the optics portion 74 of the line tracer 72 directs light beams L onto a line of the pattern. The line may be a printed line, a drawn ink line, or a drawn pencil line. In accordance with known methods, the light beams follow the pattern line. The line tracer electronics component signals the motors 56 and 80 to operate the pulleys 40 and 76 to move the lower and upper carriages simultaneously such that the line tracer is able to follow the line of the pattern. As the line tracer follows the pattern, the tool holder 90 duplicates the movement of the line tracer, such that the selected tool is adapted to trace in a selected object a pattern substantially duplicative of the pattern on the flat sheet 6. The line tracer continues through the pattern until stopped. Thus, the tracer may make repetitive passes around the pattern, permitting the tool held by the tool holder 90 to make repetitive passes along the flat stock. In due course, if allowed to proceed, a cutting tool will cut entirely through the selected object. In many applications, as in etching stone, it is desirable only to repeat the pattern in the stone and not cut entirely therethrough. In many wood working and metal working applications, it is desirable to cut entirely through the selected object. In additive operations, such as decorating or application of adhesive, a single pass usually is sufficient.

The arrangement of the rollers 22 on opposite sides of the L-beam flange 16 affords stability of the lower carriage. Movement of the tool holder 90 and line tracer 72 to the right, as viewed in FIGS. 1 and 4, might tend to lift the upper roller 22 off the L-beam flange 16, but the presence of the lower roller 22 insures that the lower carriage remains stable. Similarly, the rollers 68, 70, on opposite surfaces of the support tube 34 insure that the weight of the line tracer 72 and tool holder 90 and the tool held therein do not cause lifting of the upper roller 68 from the support tube 34.

Referring to FIGS. 3 and 4, it will be noted that the tube 12 extends rearwardly of the table 2 a distance sufficient to support the pulley 42 when the rollers 22 reach their extreme rearward position.

On the front bar 62, there optionally may be fixed a wire rack 92 supported by poles 94. Various electrical wires, such as those interconnecting the line tracer 72 and the drive motors 56, 80, may be draped over the rack 92 which holds the wires out of the way of the moving carriage components.

In prior art machines of this character, it has been customary to use solid steel components, such that the assembly remains stable throughout extremes of travel of the carriage. In the present machine, there are utilized L-beams, U-beams, hollow bars, and tubular stock, all of which has reduced the cost of the machine to about one-third that of prior machines. The arrangement of the rollers 22 and the rollers 68, 70 contributes significantly to the stability of the machine. The reduced weight permits use of less power to move the carriage and therefore lower operating costs.

Thus, there is provided a complete apparatus for working flat stock in accordance with a selected base pattern or template. The apparatus is less expensive to purchase, ship and operate than prior art assemblies of a generally similar nature. In addition to the foregoing, the apparatus may be provided with means (not shown) for increasing and reducing the size of the working pattern relative to the size of the base pattern. Thus, using only one pattern an operator may produce a number of different sizes of worked pieces, each of the same configuration as the base pattern.

It is to be understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. An apparatus for working flat stock in accordance with a pattern, said flat stock being spaced from said pattern, said apparatus comprising a table (2) having a planar surface (4) adapted to receive said pattern thereon, first and second support means disposed, respectively, on opposite side edges of said table, said first support means comprising a flange (16) extending outwardly from said table (2) and adapted to receive rollers (22) on upper and under surfaces thereof, said second support means comprising a first U-beam(10) fixed to said table (2) and having fixed therein a first rigid tubular member (12), said tubular member (12) being adapted to receive a pair of lower carriage pulley wheels (40, 42) thereon, tracer means (72) adapted to automatically move along lines defining a configuration of said pattern, a carriage assembly (20) adapted to move in accordance with instructions received from said tracer means (72), said tracer means (72) being mounted on said carriage assembly (20), said carriage assembly (20) comprising a lower carriage assembly (36, 26, 32, 34) supported by said first and second support means (16, 10), said lower carriage assembly (36, 26, 32, 34) comprising a lower carriage L-beam (26), and a parallel pulley carriage member (36) extending fore and aft, interconnected by lower carriage U-beams (28, 30) extending sidewise of the apparatus and in which are fixed, respectively a rigid front upper carriage support tube (32) and a rigid rear upper carriage support tube (34), a roller support plate (24) fixed to said lower carriage L-beam (26) and having rotatably mounted thereon a pair of said rollers (22), a tool holder (90) mounted on said carriage assembly (20), said carriage assembly (20) being adapted to move said tool holder (90) over said flat stock in a configuration duplicating the configuration of said pattern, whereby a tool fixed to said tool holder is adapted to effect a working operation on said flat stock in accordance with said configuration of said pattern.

2. The apparatus in accordance with claim 1 wherein said pulley carriage member (36) has rotatably mounted thereon said pair of lower carriage pulley wheels (40, 42) supported by and adapted to roll on said rigid first tubular member (12).

3. The apparatus in accordance with claim 2 wherein said carriage assembly (20) further comprises an upper carriage assembly (60) movably mounted on said lower carriage assembly (36, 26, 32, 34), said lower carriage assembly being movable over said table in fore-and-aft directions and said upper carriage assembly (60) being movable on said lower carriage assembly (36, 26, 32, 34) in sidewise directions.

4. The apparatus in accordance with claim 2 wherein said upper carriage assembly (60) comprises a front bar (62) having fixed thereto at one end thereof a side bar (64), said tracer means (72) and said tool holder (90) being mounted on said front bar (62), a free end of said side bar having a roller mounting plate (67) fixed thereto, and upper and lower rollers (68, 70) rotatably mounted on said roller mounting plate (67) and adapted to rollingly engage, respectively, upper and under surfaces of said rigid rear upper carriage support tube (34) fixed in a rearward-most (30) of said lower carriage U-beams (28, 30).

5. The apparatus in accordance with claim 4 wherein said rearward-most lower carriage U-beam (30) has a central slot (71) therein through which said lower roller (70) extends to engage said under surface of said rigid rear upper carriage support tube 34.

6. The apparatus in accordance with claim 4 wherein said front bar (62) has mounted thereon a pair of upper carriage pulley wheels (76, 78) adapted to roll on said rigid front upper carriage support tubes (32) fixed in the forward-most (28) of said lower carriage U-beams (28, 30).

7. The apparatus in accordance with claim 6 wherein each of said lower carriage pulley wheels (40, 42) and said upper carriage pulley wheels (76, 78) comprises a central cylindrically shaped portion (44) and opposed flange portions (46, 48), said flange portions (46, 48) being tapered such that said tapered flange portions (50, 52) engage the tube members (12, 32) on which said pulley wheels (40, 42, 76, 78) travel.

8. The apparatus in accordance with claim 7 wherein one (40) of said lower carriage pulley wheels (40, 42) and one (76) of said upper carriage pulley wheels (76, 78) is provided with a toothed circular portion (54, 84), and wherein said apparatus further comprises a lower carriage drive motor (56) and an upper carriage drive motor (80), a lower carriage drive gear (58) operated by said lower carriage drive motor (56) and in threaded engagement with said lower carriage pulley wheel toothed portion (54), to cause turning of said lower carriage pulley wheel (40) and thereby movement of said lower carriage (36, 26, 32, 34), and an upper carriage drive gear (82) operated by said upper carriage drive motor (80) and in threaded engagement with said upper carriage pulley wheel toothed portion (84), to cause turning of said upper carriage pulley wheel (76) and thereby movement of said upper carriage (60).

9. The apparatus in accordance with claim 8 wherein said carriage drive motors (56, 80) operate in response to signals from said tracer means (72).

* * * * *

UNITED STATES PATENT AND TRADEMARK OFFICE
CERTIFICATE OF CORRECTION

PATENT NO. : 5,431,732
DATED : July 11, 1995
INVENTOR(S) : Carrell, et. al.

It is certified that error appears in the above-indentified patent and that said Letters Patent is hereby corrected as shown below:

Column 1, Line 55: Delete "units" and insert --unit,-- therein; and

Column 6, Line 3: Delete "claim 2" and insert --claim 3-- therein.

Signed and Sealed this

Twenty-sixth Day of September, 1995

Attest:

BRUCE LEHMAN

Attesting Officer      Commissioner of Patents and Trademarks